United States Patent

[11] 3,570,558

[72] Inventor Maurice D. L. Lachaussee
 360 rue del'Yser, Ans-LeZ-Liege, Belgium
[21] Appl. No. 733,861
[22] Filed June 3, 1968
[45] Patented Mar. 16, 1971
[32] Priority June 14, 1967
[33] Belgium
[31] 41,387

[54] CONTINUOUSLY ROTATING FILLING MACHINE HAVING A VOLUMETRIC METERING DEVICE FOR PULVERULENT OR GRANULAR MATERIAL
 11 Claims, 4 Drawing Figs.
[52] U.S. Cl............................................................ 141/140,
 86/31, 141/146, 141/158, 222/168.5, 222/302,
 222/370
[51] Int. Cl...................................................... B65b 57/06
[50] Field of Search.......................................... 86/23, 31;
 141/131, 133, 140, 141, 145—147, 152, 158;
 222/168.5, 302, 355, 370

[56] References Cited
 UNITED STATES PATENTS
 1,105,173 7/1914 Baker........................... 141/140
 3,168,121 2/1965 Barthelemy.................. 141/141

3,371,689 3/1968 Carruthers.................. 141/146X

*Primary Examiner*—Laverne D. Geiger
*Assistant Examiner*—Edward J. Earls
*Attorney*—Young & Thompson ABSTRACT: In a continuously rotating filling machine there is provided a volumetric metering device for supplying a charge of granular or pulverulent material to cases, comprising a drum rotating about a fixed vertical shaft and having at its periphery cavities for lodging the cases to be filled, which receive in turn a charge of pulverulent material through distributing means composed of a distribution plate rotating about said fixed shaft with said drum and having vertical peripheral channels arranged opposite said cases for transferring into said cases said charge of material from a fixed supply vat of arcuate shape, during a part of the rotation of said distributing plate, each channel having an upper metering cavity containing a sliding metering piston which is integral with a horizontal arm of a vertical piece having rollers rolling on a fixed cam causing said vertical piece to move alternately up and down so that said metering piston enters said fixed vat and for extracting therefrom a charge of material which at the end of the downward stroke of said metering piston falls into said channels located above said cases.

Patented March 16, 1971 3,570,558

INVENTOR
MAURICE DÉSIRÉ LUCIEN LACHAUSSÉE
By Young & Thompson
ATTYS.

INVENTOR
MAURICE DÉSIRÉ LUCIEN LACHAUSSÉE
By Young & Thompson
ATTYS.

Patented March 16, 1971 3,570,558
4 Sheets-Sheet 4
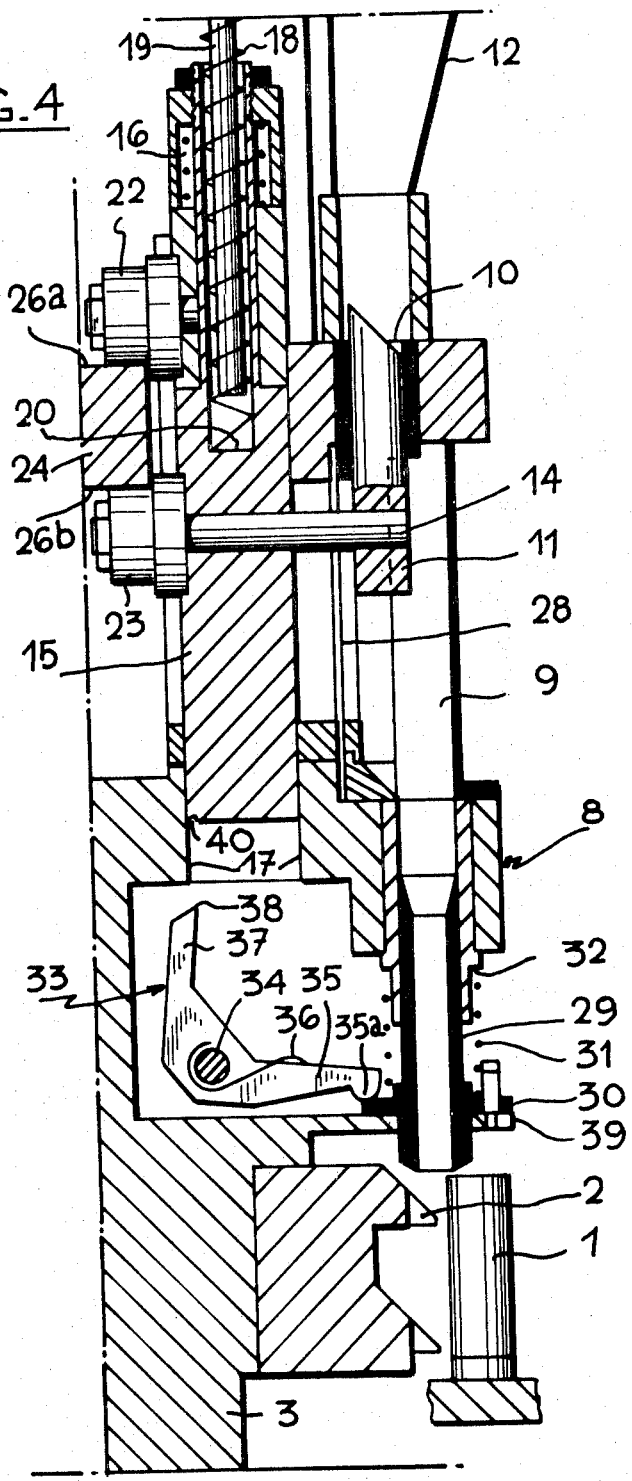
INVENTOR
MAURICE DÉSIRÉ LUCIEN LACHAUSSEE
By Young & Thompson
ATTYS.

CONTINUOUSLY ROTATING FILLING MACHINE HAVING A VOLUMETRIC METERING DEVICE FOR PULVERULENT OR GRANULAR MATERIAL

The present invention relates to a volumetric metering device for pulverulent or granular material in a continuously rotating filling machine having a drum rotating around a fixed shaft, with at its periphery small cavities for the reception of cases to be filled, to which cases in succession an amount of the above-mentioned material is supplied by distribution means.

Known machines of this type are provided with devices in which the amount of pulverulent or granular material, such as powder, to be introduced into each such case is supplied from a hopper or vat, and falls by the force of gravity into metering cavities formed in a plate or disc surmounting a drum rotating about a fixed shaft and having its periphery cavities in which the cases to be filled are housed. In this case, the air contained in the metering cavities must be expelled through the pulverulent or granular material which is falling into the said cavities, and this becomes difficult when the rhythm of production increases i.e. when the drum is rotating at high speed. As a result the air may remain in the pulverulent or granular materials thus diminishing the amount of pulverulent or granular material introduced into the case and causing a metering error in respect of this amount.

The aim of the present invention, in a continuously rotating filling machine, is to create a new volumetric metering device by which it is possible to overcome the above-mentioned disadvantages of known devices.

To this end distribution means are constituted by a distribution plate rotating about the fixed shaft of the machine together with the drum and having vertical peripheral channels arranged opposite the above-mentioned cases and used for transferring into the latter the charge of material supplied from a fixed supply vat of arcuate shape during a period of the combined rotation of the distribution plate and the drum; each channel of the said distribution plate has an upper metering cavity in which a metering piston slides under the action of control means, which means introduces the said piston into the mass of material contained in the supply vat and withdraws the said piston therefrom during the course of the trajectory of the corresponding channel below the said vat for sucking down during such withdrawal, into the metering cavity of the corresponding channel, a predetermined amount of material, which then falls by gravity into the corresponding case during the period of time when the metering piston is at its bottom dead point.

In accordance with a feature of the invention, the control means for each metering piston and for bringing about its displacement, comprises an arm integral with the metering piston, a crosspiece integral with the said arm and displacable vertically following a guide means on meeting with means which urges said crosspiece elastically downwards, i.e. a spring, and at least one follower element mounted laterally on the said crosspiece and moving on a fixed cam surrounding the above-mentioned fixed shaft, the said cam having a raised portion over which the follower element passes, the metering piston being thus displaced in the fixed vat, in the metering cavity and in the corresponding peripheral channel for sucking a predetermined amount of pulverulent or granular material above-mentioned and for pouring it out into the said peripheral channel, whence it falls into the case.

In accordance with another constructional feature of the invention, the follower elements integral with each of the crosspieces are constituted of two rollers arranged one above the other on either side of the fixed cam in the form of a crown and constituting a rolling path whose upper face has a raised portion at the locality of the supply vat and a cavity at the locality of discharge of the metering cavity, whereas on its lower face it has a depression at the said locality of the vat; the upper roller is kept constantly in contact with the upper face of the cam, whereas the lower roller rolls on the lower face of the cam only at the locality of the said vat; as a result of this assembly, each metering piston is controlled directly in its rising movement in the vat and its descending movement outside the latter, thus ensuring regularity of dosage whereas discharge from the metering cavity results from the action of the spring urging the crosspiece downwardly, or the action of gravity.

To enable flow by gravity of the pulverulent or granular material to take place in the vertical peripheral channel the metering piston has its upper face arranged at an angle.

In accordance with an advantageous feature of the invention the arm which is integral with the metering piston is displaced in a vertical slot provided in the wall of the above-mentioned vertical channel.

In order to avoid flow of the pulverulent or granular material in the channel when there is no case to be filled below the said channel, the device has blocking means for the metering piston in the corresponding metering cavity.

In accordance with an advantageous feature of the invention, the means for blocking the metering piston comprise a filler funnel for the corresponding case mounted slidingly in the lower portion of the vertical peripheral channel and urged elastically downwardly, a locking lever mounted on a pivot pin, one arm of the said lever cooperating with the said funnel and its other arm having at its end a nose engaging in a notch of the said crosspiece which is thus arrested when there is no case to be filled below the said funnel.

For regulating the levels of the upper and lower dead centers of the stroke of each metering piston, the volumetric metering device comprises a micrometric screw for regulating the level of the above-mentioned fixed cam.

Other details and features of the invention will appear in the course of the description and the drawings attached to the present specification, which represent diagrammatically and only by way of example one embodiment of the device in accordance with the invention.

FIG. 4 is a section view similar to that of FIG. 3 and showing the metering piston in an intermediate position of nonfilling of a case.

In the various FIGS. which comprise only elements useful for comprehension, the same reference numbers designate identical members.

Figure 1:
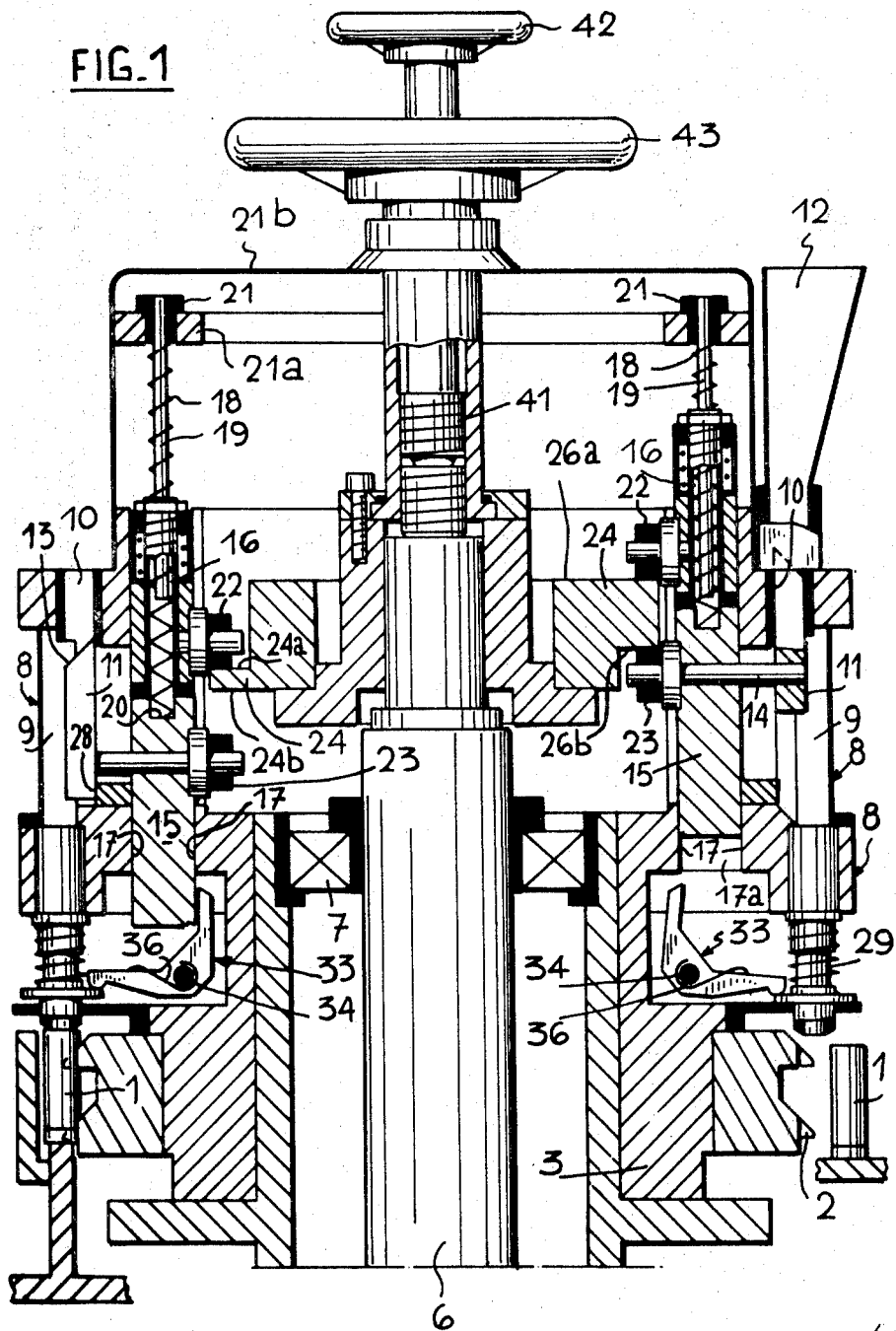
FIG. 1 is a partial diagrammatic view in vertical cross section of a continuously rotating filling machine having a volumetric metering device in accordance with the invention.

In the present description the word "case" should be taken in its widest significance, covering both covers for cartridges used for hunting as well as covers for cartridges used in fire arms, boxes, bottles, pots, receptacles or other packing articles of whatsoever nature of the same type.

The filling machine under consideration, provided with a volumetric metering device in accordance with the invention, is adapted to fill cases 1 for instance the covers of cartridges used for hunting, with a pulverulent or granular material, for instance powder.

In the know way, the cases 1 which are to receive a charge of pulverulent or granular material are arranged in the small cavities 2 formed at the periphery of a drum 3 rotating under the influence of a control member which is not illustrated; the said cases 1 are held in the cavities 2 by being guided along a fixed peripheral guide 4, and they are supported by a fixed circular crown 5. The rotating drum 3 is mounted on a bearing 7 on a fixed shaft 6.

The volumetric metering device in accordance with the invention comprises essentially a distribution plate 8 rotating about the fixed shaft 6 together with the drum 3 and having vertical peripheral channels 9 arranged opposite cavities 2; at their upper end, the said channels have metering cavities 10 in each of which a metering piston such as 11 slides; the distribution plate 8 rotates below a supply vat 12 of arcuate form which contains the pulverulent material to be distributed. For each cavity 2 of the drum 3 there is a channel 9 located above the said cavity.

Each metering piston such as 11 has an upper face 13 at an inclined angle and is integral with a horizontal arm 14 which slides in an oblong slot 28 formed in one wall of the channel 9. The said arm 14 is integral with a vertical crosspiece 15 which has a recess 16. The said crosspiece 15 is guided along the walls 17 in a guide cavity 17a provided in the distribution plate 8. A helicoidal spring 18 guided and held by a rod 19 abuts on the one hand against the bottom 20 of the recess 16 and on the other hand against a fixed stop 21 integral with the rod 19 carried by a crown 21a fixed to a cup-shaped member 21b. The crosspiece 15 is accordingly constantly urged downwardly by the said spring 18.

Figure 2:
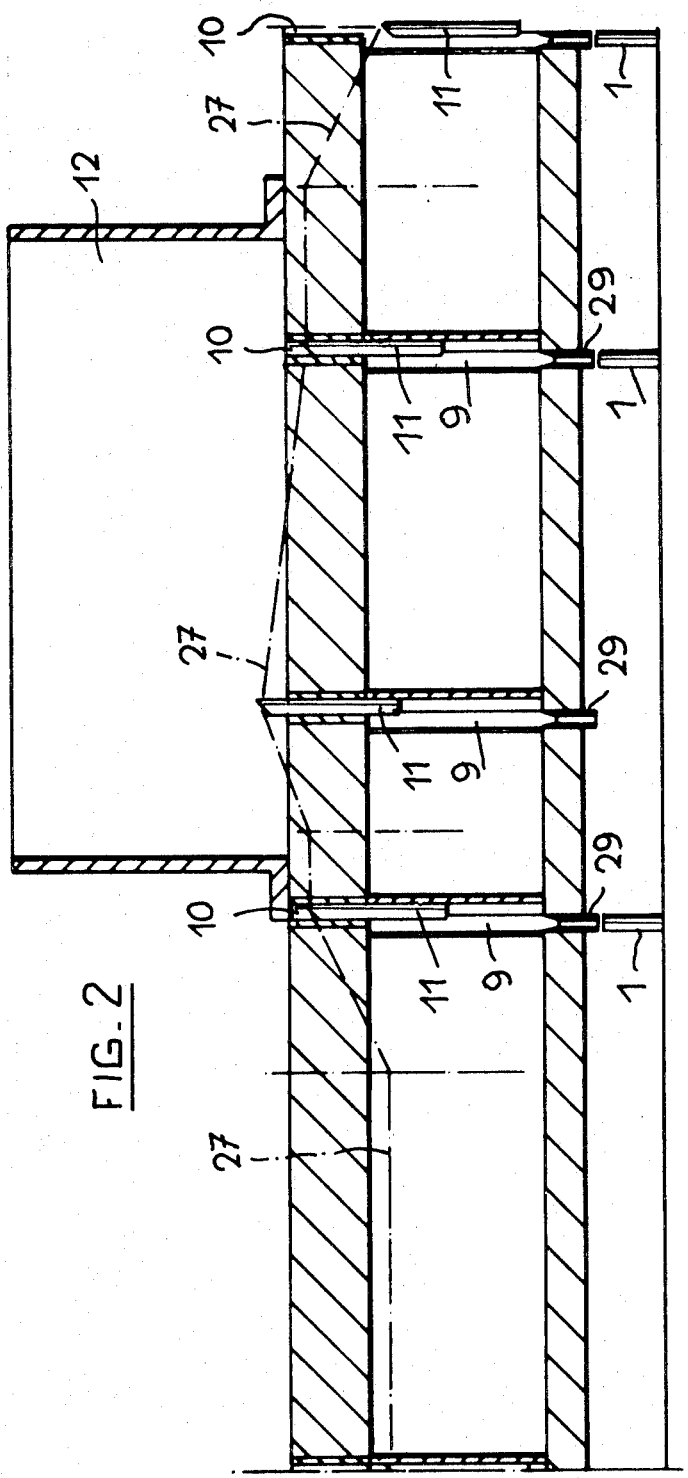
FIG. 2 is a partial diagrammatic view in developed form, of the device in accordance with the invention, showing the various positions of the metering piston in the course of one rotation of the distribution plate.
Figure 3:
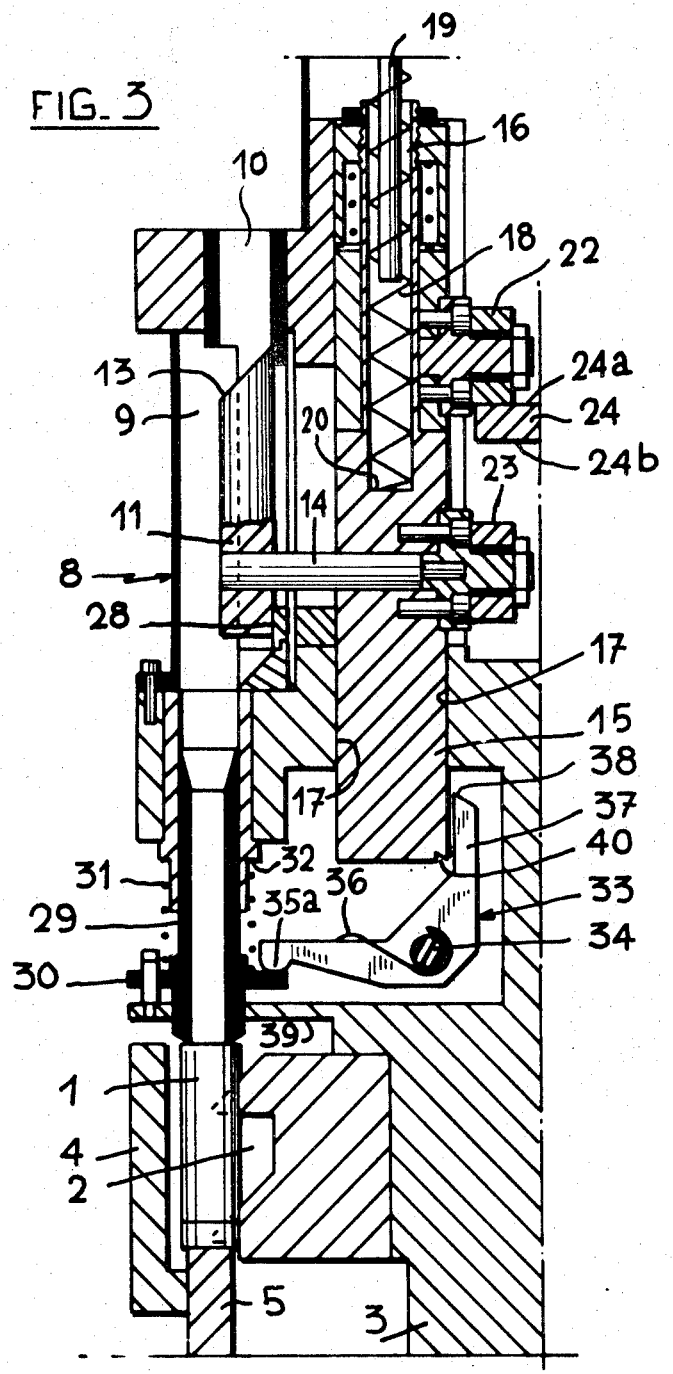
FIG. 3 is a partial diagrammatic view in vertical axial section of a filling machine showing a detail of the device in accordance with the invention which illustrates the blocking device, showing the metering piston at its lower dead center in position for filling a case.

Two rollers 22 and 23, are mounted on each crosspiece 15, one above the other and on either side of a fixed cam 24 in the form of annular crown and constituting a rolling path. As the crosspiece 15 is constantly urged downwards by the helicoidal spring 18, the upper roller 22 is constantly held in contact with the upper face 24a of the fixed cam 24 on which it rolls. As can be seen from FIG. 1, the said cam 24 dead center, on its upper rolling face 24a a raised portion 26a arranged at a locality corresponding to the beginning of the supply vat 12. In this way, by rolling on the face 24a, the roller 22 rolls on the raised portion 26a and accordingly entrains upwardly the crosspiece 15 and the metering piston 11 with which it is integral; by this vertical displacement, the said piston 11 penetrates into the metering cavity 10 and the vat 12. From its supper dead center, the metering piston 11 begins its downward stroke which is directly controlled by a depression 26b of the lower face of the cam 24 against which the lower roller 23 rolls, which accordingly forces the crosspiece 15 and the metering piston 11 to be displaced downwardly; and the said metering piston is withdrawn from the vat 12 sucking from the latter a quantity of material which is always the same into the metering cavity 10. The said sucking of a charge of pulverulent material from the mass of material contained in the supply vat 12 avoids the introduction of air into the metering cavity. The said movements of rising and descent of the metering piston 11 are followed by level stretches corresponding to the horizontal parts of the upper face 24a of the cam 24. During the course of one complete rotation about the fixed shaft 6, the roller 22 rolls constantly on the upper face 24a, whereas the roller 23 rolls against the lower face 24b only at the locality 26b to control the descent of the piston 11 which is displaced in an ascending and descending stroke corresponding to a curve indicated by the development shown in dotted lines 27 in FIG. 2. This development also corresponds to the profile along the upper face 24a of the cam 24 and in addition causes the appearance also of the raised portion of the said face.

On the development 27, it can be seen that the metering piston 11 in the course of one rotation of the rollers 22 and 23 about the fixed shaft 6, returns into the fixed vat 12, descends into its metering cavity 10 sucking the pulverulent material and issues from the said metering cavity through the lower portion of the latter when the corresponding channel 9 is no longer below the supply vat 12. The metering piston 11 reaches its lower dead center, which corresponds to one position of the roller 22 on a low horizontal portion of the upper face 24a of the cam 24 and remains in this position for a specific period. During this period, the charge of pulverulent material contained in the metering cavity 10 falls by the force of gravity into the channel 9 and into the case 1 which is located underneath the said channel. The charge of pulverulent material contained in the metering cavity is completely evacuated from the latter by virtue of the upper inclined face 13 of the metering piston 11.

After passing through the channel 9, the charge of pulverulent material falls into a funnel 29 having a collar 30 and arranged to slide in the lower portion of the said channel 9. The said funnel 29 is urged downwardly by a helicoidal spring 31 which rests on the one hand against the said collar 30 and on the other hand against a shoulder 32 which is integral with the lower portion of the channel 9, in such a way that the lower end of the said funnel 29 is pushed against the upper end of the case 1.

To prevent the charge from falling out of the metering cavity 10 when there is no case below the funnel 29 of the channel 9, means are provided for preventing the descent of the crosspiece 15 and of the metering piston 11. For this purpose, under each crosspiece an elbow lever 33 is arranged, mounted pivotably on a pivot pin 34 and under the influence of a spring 36; the end 35a of an arm 35 of the said lever abuts against the collar 30 of the funnel 29, whereas the other arm 37 has a nose 38. When there is no case underneath the funnel 29, the collar 30 is accordingly applied against a stop 39; under the action of the spring 36 the end 35a of the arm 35 follows the said collar 30 and the lever 33 pivots in such a way that the nose 38 of the arm 37 puts itself in a position such that it engages in a notch 40 of the crosspiece 15 when the latter is executing its downward movement. The crosspiece 15 and the metering piston 11 are accordingly blocked.

In order to regulate the height of the upper dead center of the metering piston, there is provided a micrometric screw 41 for regulating the height of the cam 24 on the fixed shaft 6, displacement and blocking taking place by the manipulation of the hand wheels 42 and 43.

It is obvious that the invention is not exclusively restricted to the embodiment illustrated, and that many modifications can be made in the form, arrangement and constitution of certain of the elements used in its realization. on the condition that these modifications are not in contradiction with the aim of the following claims.

I claim:

1. A continuously rotating filling machine comprising a rotary drum, a fixed shaft about which said drum is rotated, housing cavities at the periphery of said rotary drum, cases to be filled being lodged in said housing cavities, distribution means for distributing an amount of said granular material to said cases, said distribution means comprising a distribution plate rotating about said fixed shaft together with said drum, a fixed supply vat containing said granular material, vertical peripheral channels arranged in said distribution plate opposite said cases for transferring into said cases a charge of said granular material from said fixed supply vat during a part of the combined rotation of said distribution plate and said drum, said fixed supply vat being arcuate, an upper metering cavity in each channel of said distribution plate, a metering piston in said metering cavity control means moving said metering piston alternately upwardly and downwardly to slide said metering piston in said metering cavity whereby said metering piston during upward movement is introduced into said granular material contained in said fixed supply vat and during downward movement is withdrawn therefrom during the travel of the channel corresponding to said metering cavity under said fixed supply vat, thereby to suck down into said metering cavity a determined quantity of material, said channel communicating between said metering cavity and said corresponding case when said metering piston is at its bottom dead point so that said quantity of material falls at the end of the downward stroke of said metering piston, by gravity, into said corresponding case located under said channel, during the time when said metering piston is at is bottom dead point.

2. A filling machine as claimed in claim 1, characterized in that the control means of each metering piston for moving said metering piston comprises an arm integral with said metering piston, a crosspiece integral with said arm and displaceable vertically in the guide cavity against a means which urges said crosspiece elastically downwardly, and at least one follower element mounted laterally on said crosspiece, said follower element running on a fixed cam surrounding said above mentioned fixed shaft, said cam having a raised portion on which said follower element passes, said metering piston being thus displaced in said fixed supply vat, in said metering cavity and in said corresponding channel to suction a determined quantity of pulverulent or granular material above mentioned out of said fixed supply vat and to pour it into said channel from where it falls into said case.

3. A filling machine as claimed in claim 2, characterized in that said follower elements integral with each of said crosspieces are constituted of two rollers.

4. A filling machine as claimed in claim 3, characterized in that said two rollers of each said crosspiece are arranged above each other and on either side of said fixed cam forming rolling path.

5. A filling machine as claimed in claim 4, characterized in that the above-mentioned fixed cam has the form of an annular crown and has on its upper face a raised portion at the locality of the fixed supply vat and a cavity at the locality of discharge of the metering cavity, whereas on its lower face it has a depression at the same locality of the vat.

6. A filling machine as claimed in claim 4, characterized in that the upper roller rolls constantly on the upper face of the cam as a result of the thrust of a helicoidal spring arranged between the upper portion of each crosspiece and a crown, whereas the lower roller rolls on the lower face of the cam only at the locality of the depression.

7. A filling machine as claimed in claim 2, characterized in that the arm integral with the metering piston is displaced in an oblong vertical slot provided in the wall of the corresponding channel.

8. A filling machine as claimed in claim 2, characterized in that it comprises a micrometric screw for regulating the height of the above mentioned fixed cam.

9. A filling machine as claimed in claim 1, characterized in that the metering piston has an inclined upper face to permit the flow by gravity of the pulverulent or granular material into the corresponding channel.

10. A filling machine as claimed in claim 1, characterized in that it comprises a means for blocking the metering piston in the metering cavity to avoid the flow of the pulverulent or granular material in the channel when there is no case to be filled below this channel.

11. A filling machine as claimed in claim 10, characterized in that the means for blocking the metering piston comprises a filling funnel for the case mounted slidingly in the lower portion of the corresponding channel, and urged elastically downwards, a locking lever mounted on a pivot, one arm of the said lever cooperating with this funnel and its other arm having a nose engaging in a notch of the crosspiece located near said filling funnel so as to prevent the downward movement of said crosspiece when there is no case to be filled below this funnel.